(12) United States Patent
Solbrack et al.

(10) Patent No.: US 7,748,203 B2
(45) Date of Patent: Jul. 6, 2010

(54) TILTING IMPLEMENTS AND CONSTRUCTIONS FOR HILLSIDE IMPLEMENTS SUCH AS HILLSIDE COMBINE HARVESTERS

(75) Inventors: Dennis R. Solbrack, Colfax, WA (US); Scott D. Schafer, Spokane, WA (US)

(73) Assignees: The Factory Company International, Inc., Spokane, WA (US); Dennis Solbrack, Colfax, WA (US)

( * ) Notice: Subject to any disclaimer, the term of this patent is extended or adjusted under 35 U.S.C. 154(b) by 1185 days.

(21) Appl. No.: 11/346,713

(22) Filed: Feb. 2, 2006

(65) Prior Publication Data

US 2006/0220331 A1 Oct. 5, 2006

Related U.S. Application Data

(60) Provisional application No. 60/653,667, filed on Feb. 16, 2005.

(51) Int. Cl.
*A01D 75/00* (2006.01)
*B60G 17/00* (2006.01)

(52) U.S. Cl. ................................ 56/15.5; 280/6.154

(58) Field of Classification Search .............. 56/10.2 R, 56/10.2 E, 14.9, 15.1, 15.5, 15.8, 15.9, 16.2, 56/209–218, 16.5; 460/8, 9, 119, 150; 172/810, 172/811, 824–826; 280/6.154, 5.506, 5.507, 280/5.519, 6.155–6.157; 180/344, 348, 349, 180/357, 41

See application file for complete search history.

(56) References Cited

U.S. PATENT DOCUMENTS

| 2,821,059 | A | * | 1/1958 | Heitshu ........................ 56/209 |
| 3,065,590 | A | * | 11/1962 | Knollman ..................... 56/209 |
| 3,233,909 | A | * | 2/1966 | Boone ....................... 280/6.154 |
| 4,750,751 | A | | 6/1988 | Schafer |
| 5,415,586 | A | * | 5/1995 | Hanson et al. .................. 460/8 |
| 6,510,680 | B2 | * | 1/2003 | Uhlending et al. ............ 56/208 |

* cited by examiner

*Primary Examiner*—Robert E Pezzuto
(74) *Attorney, Agent, or Firm*—Lee & Hayes, PLLC

(57) ABSTRACT

An implement for negotiating sloped hillsides having a front carriage with a rigid axle that stays oriented to the slope of the ground being traversed. The front axle and drive assembly has two opposing tilt connections which allow hydraulic or other operators on the opposite side of the implement to extend and tilt the implement body to maintain a level condition. This arrangement keeps the center of gravity lower and positions the points of load application to the axle assembly nearer the ends of the axle and adjacent to the wheels and tires or other ground contacting drive. The operator on one side is contracted when the opposing operator is to be extended. One operator is used to tilt in one direction and the opposing tilt operator is used to tilt in the opposite direction.

11 Claims, 15 Drawing Sheets

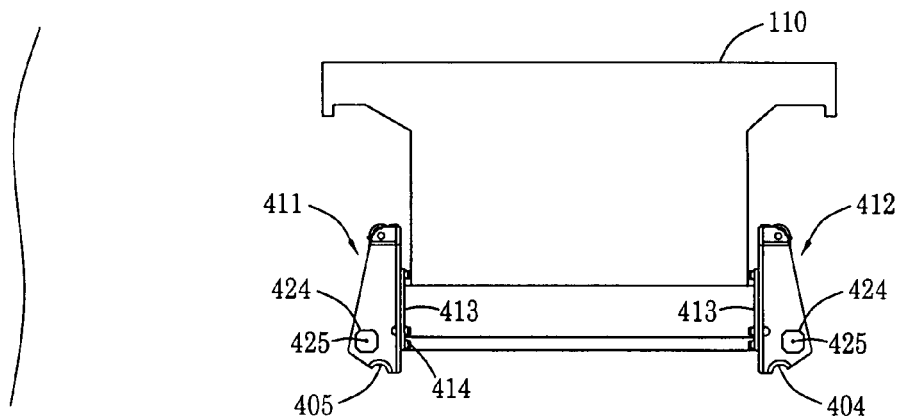
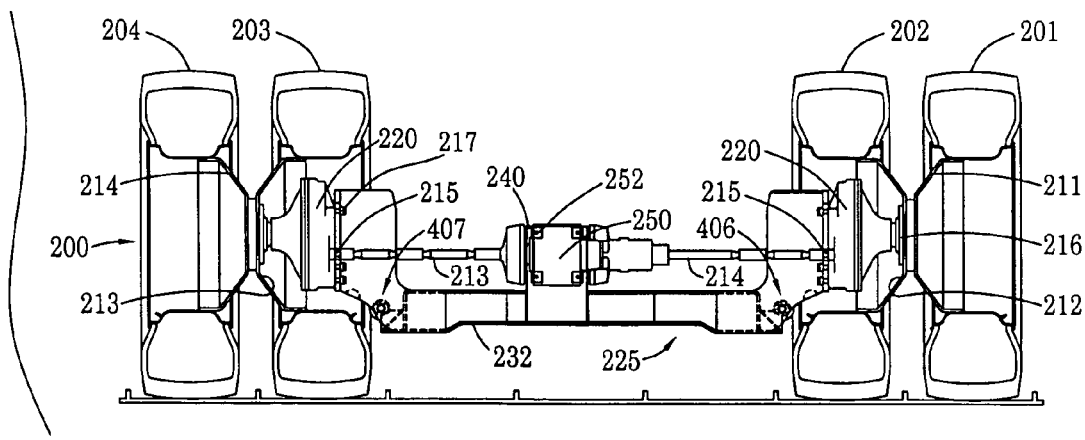
Fig. 8

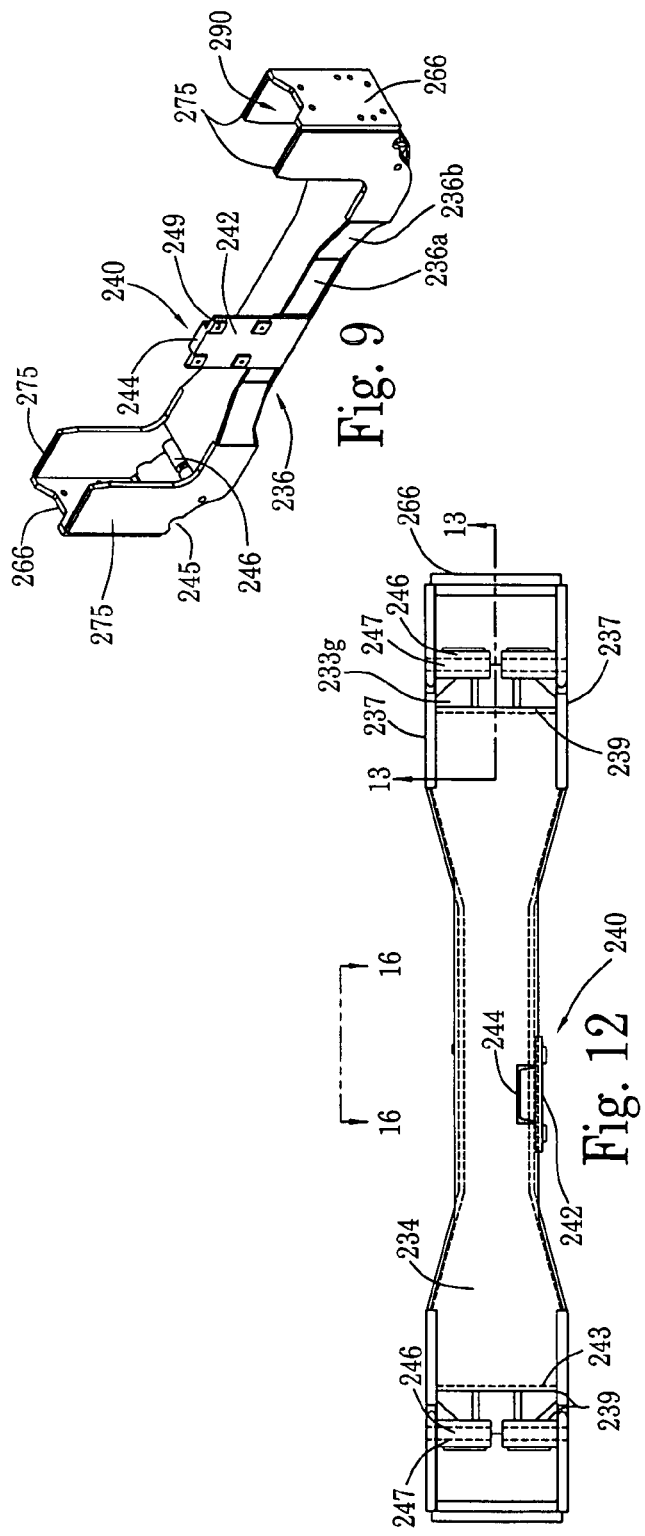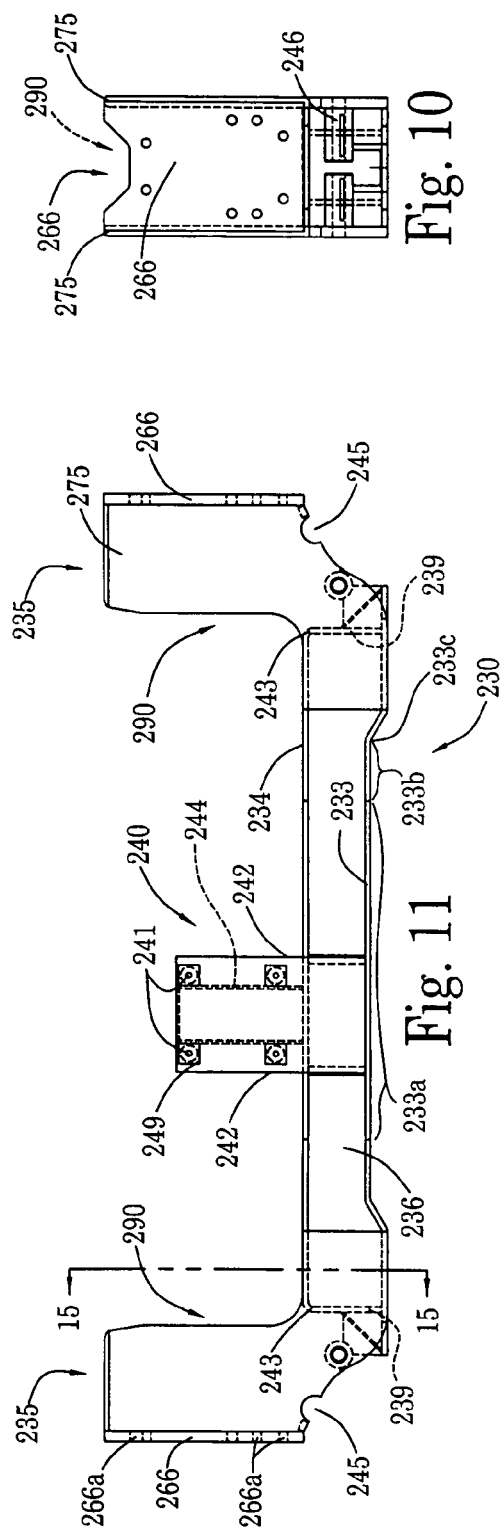

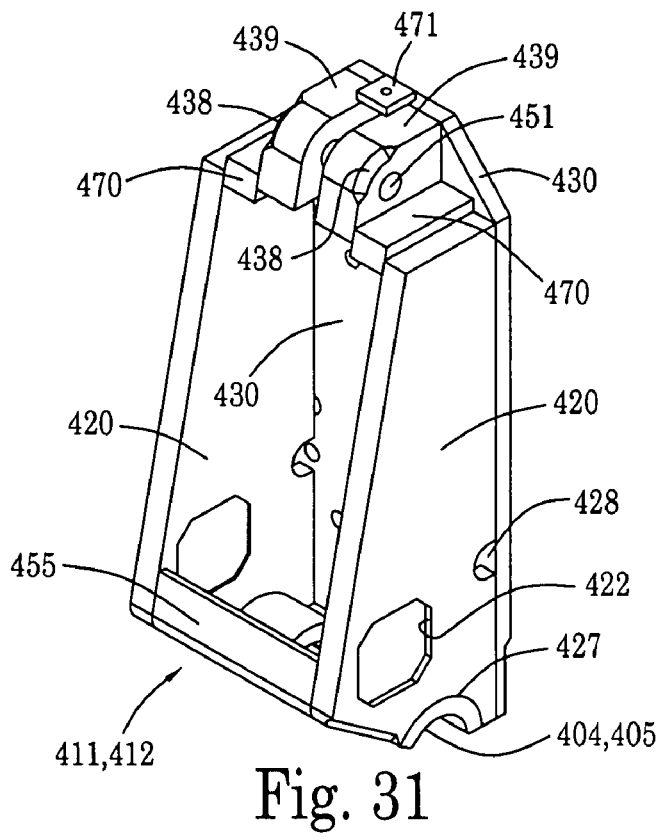
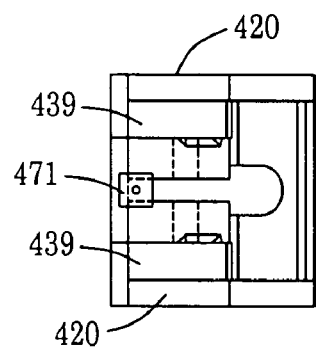
Fig. 32
Fig. 31
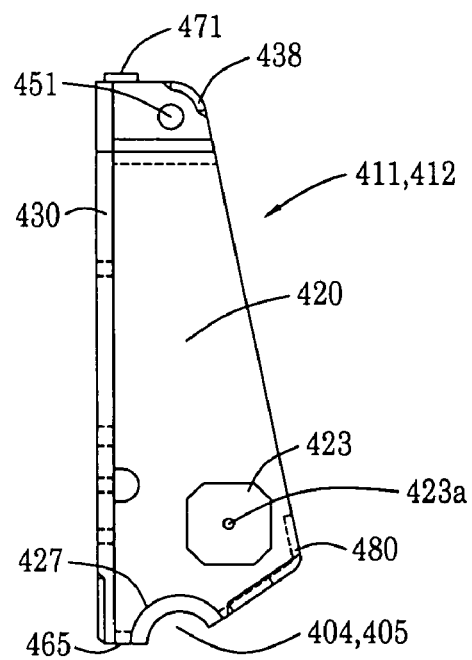
Fig. 33
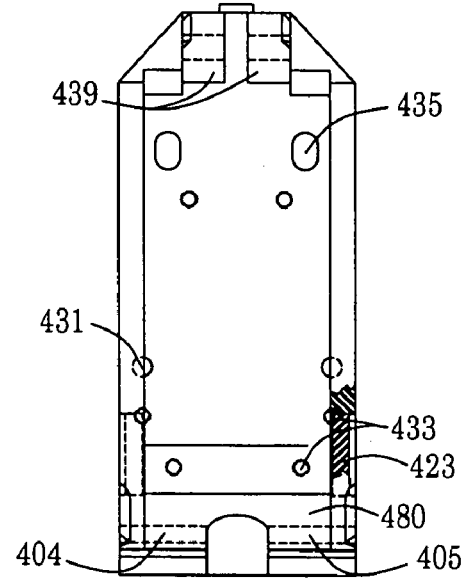
Fig. 34

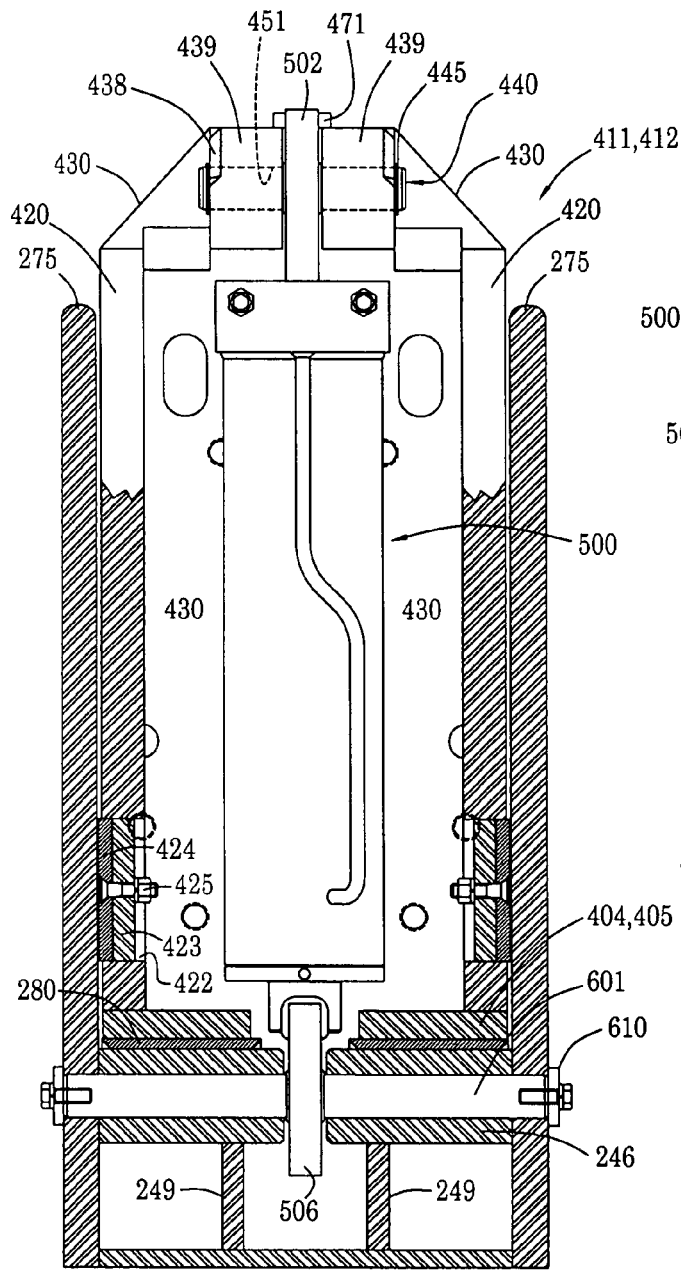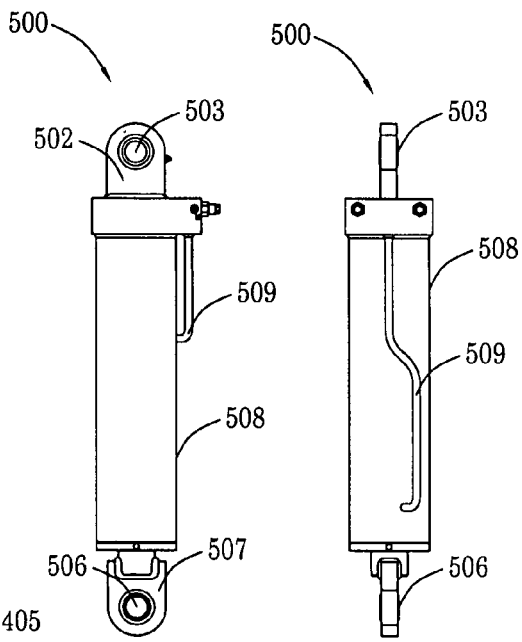
Fig. 35   Fig. 36   Fig. 37

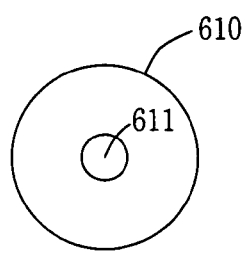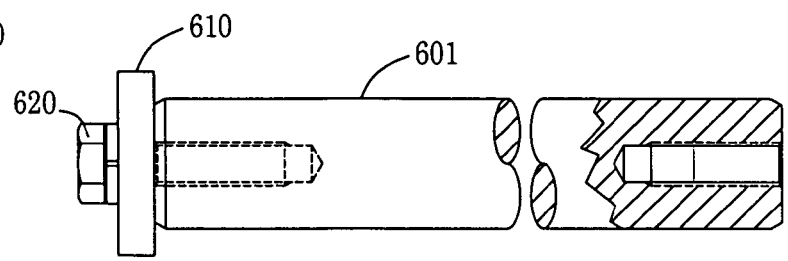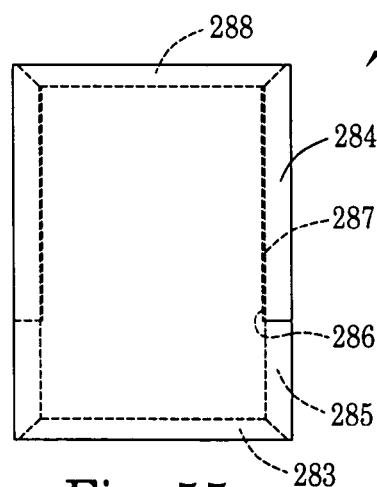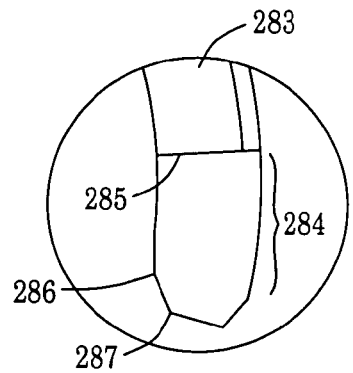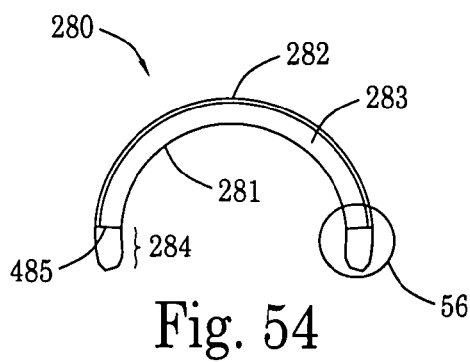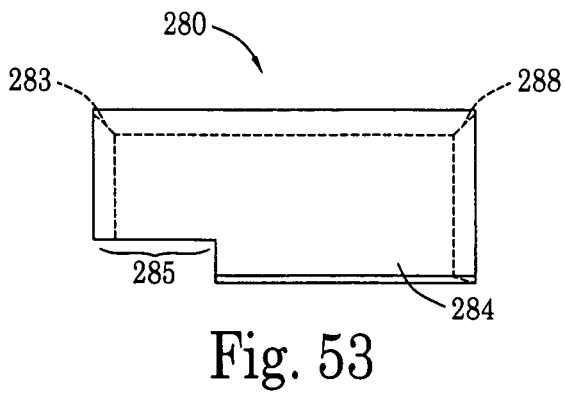

TILTING IMPLEMENTS AND CONSTRUCTIONS FOR HILLSIDE IMPLEMENTS SUCH AS HILLSIDE COMBINE HARVESTERS

CROSS-REFERENCE TO RELATED CASES

This application claims priority under 35 U.S.C. §120 to co-pending provisional patent application Ser. No. 60/653,667 filed Feb. 16, 2005.

TECHNICAL FIELD

The field of this invention is tilting axles and related constructions used on hillside implements and equipment for leveling the implement, such as for leveling hillside combine harvesters.

BACKGROUND OF THE INVENTION

In many areas there are substantial slopes and grade changes on the land surfaces. These slopes and grade changes pose problems for agricultural implements and other equipment which move over or are positioned on such grades. The grade changes experienced by implements moving thereon make optimal positioning of the implement and any header or tool carried on the implement more difficult to achieve.

One type of implement which in particular experiences such problems with sloped hillsides are combine harvesters. Combine harvesters have relatively high centers of gravity and variable amounts of weight contained in a grain bin which receives the cut and threshed grain. The high center of gravity and variable weight distribution make negotiating hillsides of varying slope difficult and dangerous in some instances.

In some leveling hillside combine harvesters each side of the main or front wheels are operated up and down in a range of positions which maintain the large wheels at each side in a vertical or near-vertical position over the full range of vertical adjustment. This works well when there are single wheels at each side. However, when dual wheels are used at each side, then leveling a combine on a hillside will cause contact to be made with the ground less even and can cause only one wheel of each dual wheel set to always be in ground contact at each side of the implement. Thus, the reasons and advantages for having dual wheels are in some cases rendered less effective.

One approach uses a continuous front axle construction having a central pivot at or near the center of the axle. This construction places all of the weight carried by the front axle onto a single pivot located at the midpoint of the axle. Placing all the front axle weight of a loaded combine onto a single pivot creates a mechanically demanding situation for both the pivot and axle. Placing all the weight at the midpoint of the axle creates greater loading of the axle. The midpoint position typically develops the largest bending moment in the axle and with the main load centered thereon, then this problem is exacerbated. Accordingly, the axle must be built strong in order to carry this midpoint loading of the entire weight carried by the front axle. This in turn causes the front axle to have increased weight and costs of production.

Center pivot hillside leveling combines also have required the implement body to be positioned relatively high to allow adequate tire clearance when the wheels move up relative to the body. This places the center of gravity of the implement higher and this is not as preferred as a lower center of gravity.

Many prior hillside leveling machines also have a very high center of gravity. This high center of gravity exacerbates potential instability. It also increases the height differential which must be accommodated between the main part of the combine and the feeder which takes the output from the header and feeds it into the main part of the combine for threshing. The header contains the gathering reel, cutting bars and augers that move the cuttings toward the feeder. Earlier combines having two independent front axles also experience more fluctuation in this differential height between the feeder and main part of the combine.

Given these demanding design criteria it has typically been necessary to have substantially different designs for hillside combines as compared to flatland combines. Differences typically include changing the location of the front axle so that it moves further forward. This change increases the distance between the front and back wheels and increases the turning radius of the combine and making maneuvering more difficult on an implement already difficult to maneuver. It also changes the weight distribution between the wheels which may have an adverse effect on leveling and the maximum grade which can be handled by the combine.

It has also been difficult for hillside combines to adequately provide both optimal leveling of the main body and tilt angle adjustment for the header and feeder assemblies or other tool carried which must be adjustably angled for optimal performance.

The differences in design between flatland combines and hillside combines increase engineering, manufacturing and inventory costs for the manufacturer and the dealers selling the machines.

Thus, there has been a long-felt need for improved tilting hillside combines and other machines which are in need of tilt adjustments for the varying slope of terrain over which they travel and are situated. The current invention addresses one or more of the indicated deficiencies experienced by the prior art.

BRIEF DESCRIPTION OF THE DRAWINGS

Preferred forms or embodiments of the inventions are explained and characterized herein, often with reference to the accompanying drawings. The drawings and all features shown therein also serve as part of the disclosure of the inventions of the current application. Such drawings are briefly described below.

FIG. 8 is an exploded diagrammatic view showing the apparatus of FIG. 1 with the implement body detached from the front carriage assembly.

FIG. 9 is a perspective view of the axle assembly forming part of the front carriage of the apparatus shown in FIG. 1.

FIG. 10 is an end view of the axle assembly of FIG. 9.

FIG. 11 is a front view of the axle assembly of FIG. 9.

FIG. 12 is a top view of the axle assembly of FIG. 9.

FIG. 31 is a perspective view of a side support, one of which is fastened to a support mounting plate secured to the body of the implement at each side of the implement body and moves the body up and down relative to the adjacent part of the axle assembly.

FIG. 32 is a top view of the side support of FIG. 31.

FIG. 33 is a front or back view of the side support of FIG. 31.

FIG. 34 is an elevational view of the side support of FIG. 31 with portions broken away and shown in cross-section.

FIG. 35 is a diagrammatic assembly view, partial in section, of the side support and receiving part of the axle assembly with hydraulic actuators connected therebetween.

FIG. 36 is an elevational view in isolation of the hydraulic actuator shown in FIG. 35.

FIG. 37 is a side view also in isolation of the hydraulic actuator shown in FIG. 36.

FIG. 51 is a retainer washer used to help retain the lower pivot pin (of FIG. 52).

FIG. 52 is the lower pivot pin used to support the lower ends of the hydraulic actuators to the end portions of the axle assembly showing the washer of FIG. 51 mounted with a fastener.

FIG. 53 is a side view of a bearing piece which is mounted upon the cylindrical journal pieces.

FIG. 54 is an end view of the bearing piece of FIG. 53.

FIG. 55 is a top view of the bearing piece of FIG. 53.

FIG. 56 is an enlarged detail of a portion of the bearing piece taken at circle 56 of FIG. 54.

DETAILED DESCRIPTION OF THE PREFERRED EMBODIMENTS

-Introductory Note-

The readers of this document should understand that the embodiments described herein may rely on terminology used in any section of this document and other terms readily apparent from the drawings and the language common therefor as may be known in a particular art and such as provided by dictionaries. Widely known are Webster's Third New International Dictionary, The Oxford English Dictionary (Second Edition), and The New Century Dictionary, all of which are hereby incorporated by reference for interpretation of terms used herein and for application and use of words defined in such references to more adequately or aptly describe various features, aspects and concepts shown or otherwise described herein using more appropriate words having meanings applicable to such features, aspects and concepts.

This document is premised upon using one or more terms with one embodiment that may also apply to other embodiments for similar structures, functions, features and aspects of the invention. Wording used in the claims is also descriptive of the invention and the text of the claims is incorporated by reference into the description entirely in the form of the claims as originally filed. Terminology used with one, some or all embodiments may be used for describing and defining the technology and exclusive rights associated therewith.

-General Configuration and Basic Tilting Action-

Figure 1:
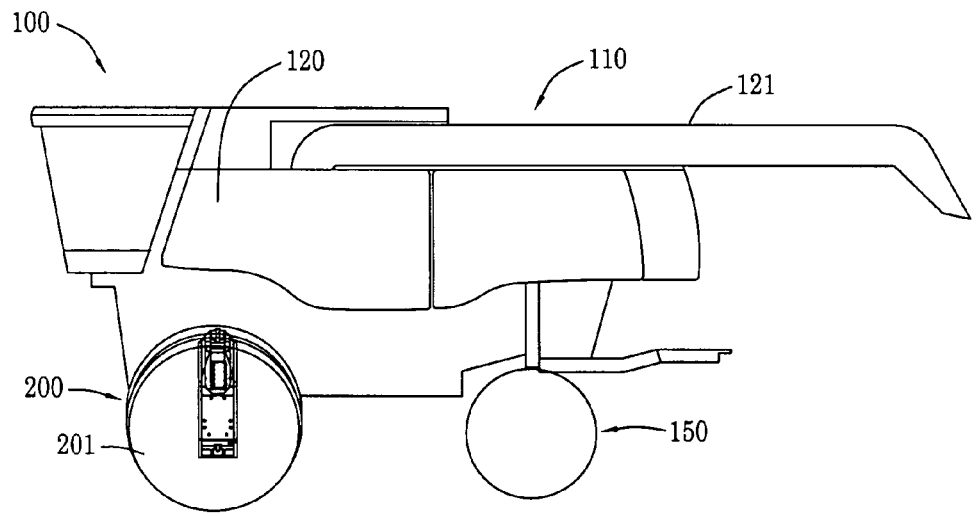
FIG. 1 is a side view of a combine harvester according to the inventions.
Figures 2, 3:
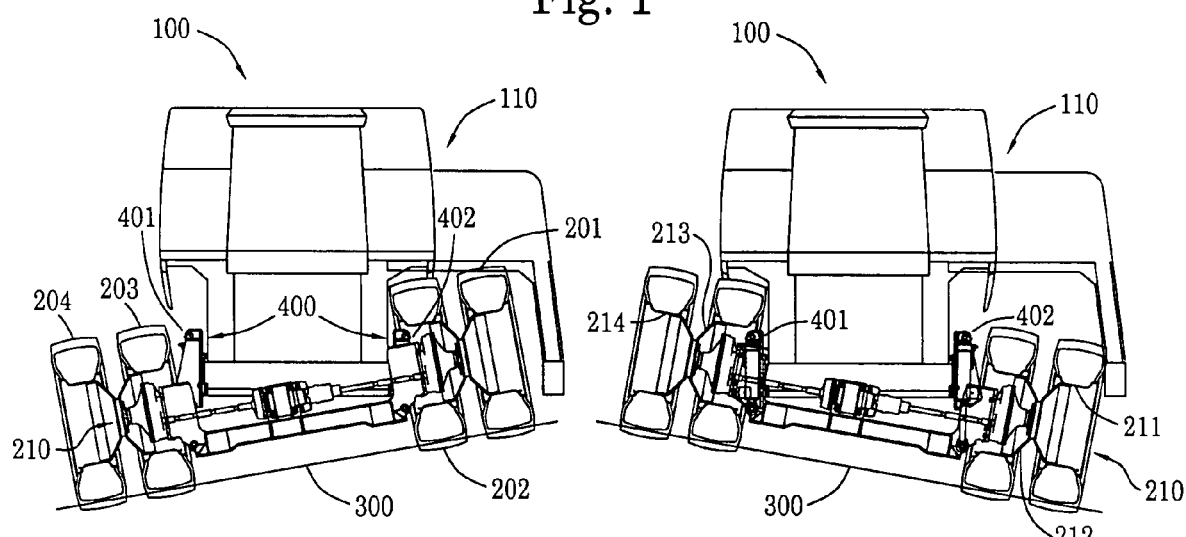
FIG. 2 is a front view of the implement of FIG. 1 shown with tilt adjustment placing the right (from driver's position) or starboard side of the implement adjusted upwardly relative to the front axle due to downward slope of the supporting surface in the right or starboard direction.
FIG. 3 is a front view of the implement of FIG. 1 shown with tilt adjustment placing the left (from driver's position) or port side of the implement adjusted upwardly relative to the front axle due to downward slope of the supporting surface in the left or port direction.

FIGS. 1-3 most easily show the general configuration of a preferred implement according to the inventions described herein. The machine or implement shown is a hillside leveling combine harvester 100. The harvester has a main body 110 which is shown diagrammatically because it may be a conventional combine harvester or a future harvester hereafter developed. The inventions include, among others, a combine fitted with the features described herein and a retrofit system which may be installed on certain combines. Other hillside implements may similarly be provided or retrofitted with various forms of the invention.

The illustrated harvester 100 also has a front carriage assembly 200 which supports the frontal parts of the harvester body 110 and cutting head assembly (not shown) upon the ground 300. Harvester 100 has front wheels 201-204 which apply the bulk of the weight of the harvester to the supporting ground 300. A rear carriage 150 is of conventional construction for a hillside combine and carries only a small part of the weight and pivots relative to the implement body 110 in response to the hillside leveling system detailed herein. The proportion of the weight may vary dependent upon the slope of the ground, amount of grain contained in the harvester grain bin 120 which may be discharged through a bin discharge such as discharge conveyor or chute 121.

FIG. 2 shows that the combine body 110 may be adjustably leveled by controlled extension of a right or starboard side using a right or first leveling assembly 401. There is also a port, left side or second leveling assembly 402 which is shown fully contracted in FIG. 2. The set 400 of opposing leveling assemblies 401 and 402 are alternatively extended to provide tilting or roll of the combine body 110 in either of two directions, upwardly at the port side or upwardly at the starboard side.

The rolling or tilt action for the starboard side causes angular displacement about an opposing pivot or other tilt connection on the opposite port side. Conversely, extension of the port side leveler causes angular displacement of the port side about an opposing pivot or other tilt connection on the opposite starboard side.

Figure 4:
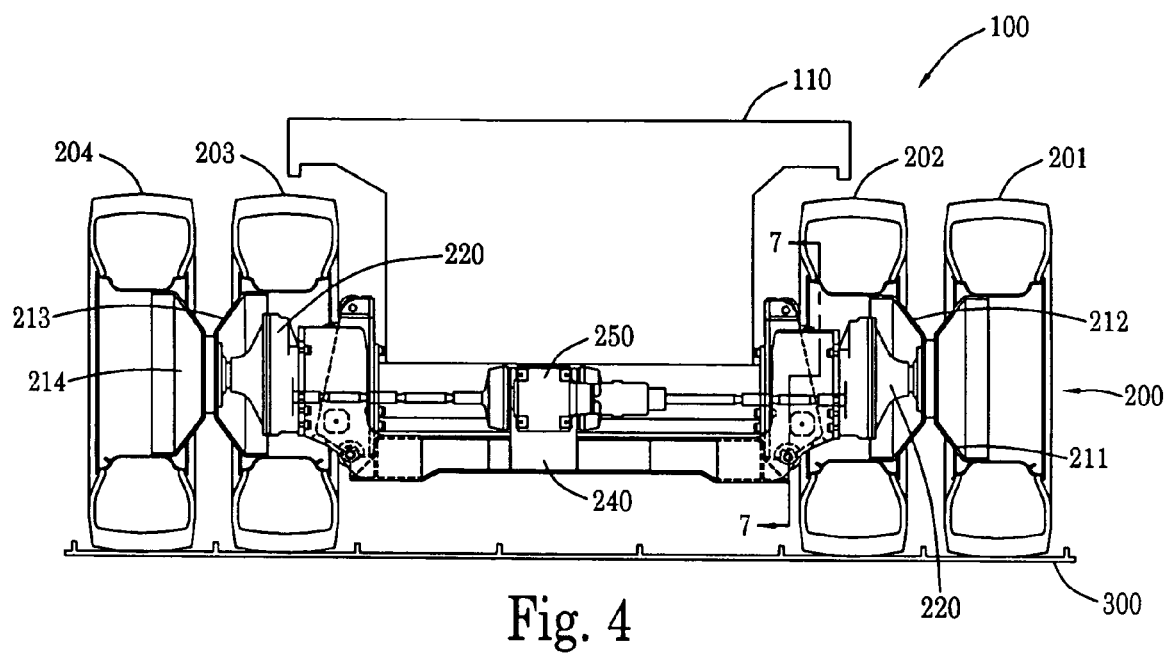
FIG. 4 is an enlarged diagrammatic front view of the front carriage of the harvester of FIG. 1 shown in a fully contracted condition which does not show any tilt adjustment.

FIG. 4 shows in greater detail the implement 100 with the body 110 fully contracted to the front carriage assembly in a flatland operational position. FIG. 4 is a view which looks from the front of the carriage.

Figure 5:
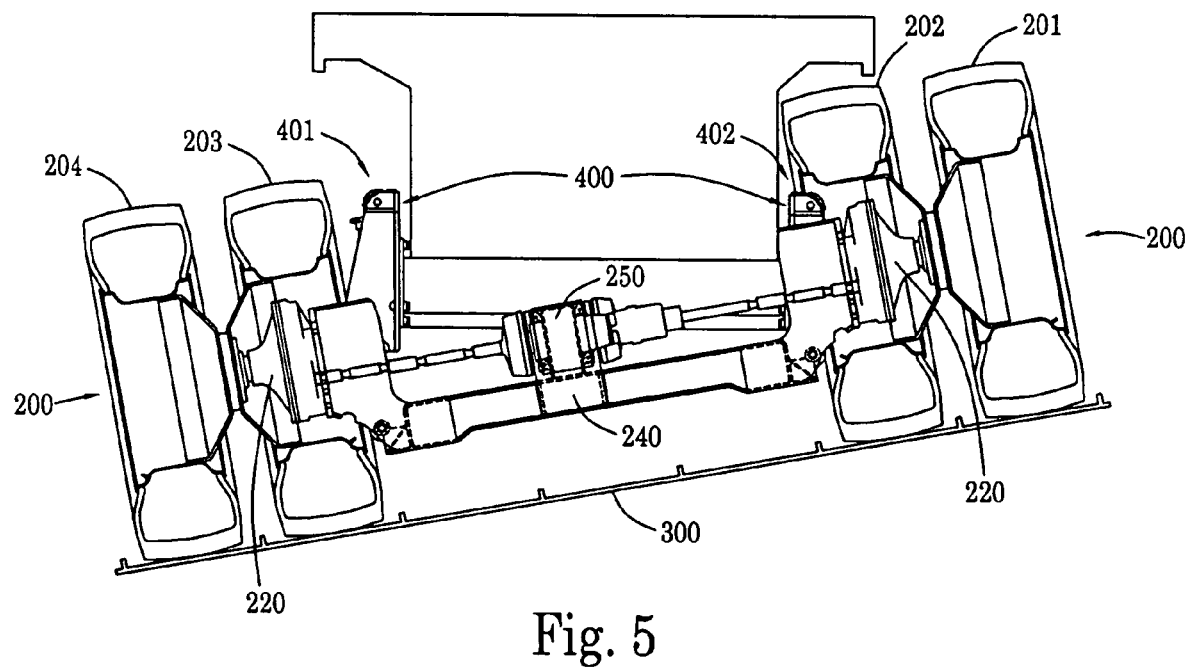
FIG. 5 is an enlarged diagrammatic view from in front of the front axle and carriage assembly. It shows the harvester of FIG. 1 with the right or starboard side adjusted upwardly relative to the front axle. Portions have been removed for illustration purposes.

FIG. 5 shows in greater detail the implement 100 with the body in a hillside extended position because the view is from the front of the carriage looking backward. FIGS. 4 and 5 illustrate how the dual or multiple tire configuration for each side of the front carriage 200 can stay in full or approximately full contact with the supporting ground 300 in either a contracted condition or a tilted condition, thus enabling both tires on each side to share the load and provide improved traction and stability for the implement over various terrain slopes. The body is kept in a level or approximately level roll orientation to also provide greater stability and improved positioning of the center of gravity of the implement body for various side hill slopes within the range of tilt capability. As shown, the implement and leveling system are designed to accommodate approximately an 18 percent hillside slope in either direction.

FIG. 8 shows the implement body 110 in an exploded view spaced from the front support carriage 200. This FIG. shows a portion of the preferred tilt connections. As shown, the port tilt connection is provided in a form which includes port pivot rest 404. Conversely, the starboard tilt connection is shown provided in a similar form which includes starboard pivot rest 405. Pivot rests 404 and 405 engage and are supported by port and starboard carriage assembly tilt connections 406 and 407, respectively. When the associated levelers are fully contracted weight of the combine body 110 is carried through body side supports 411 and 412 which have associated pivot or other tilt connection rests 405 and 406 that bear upon the carriage 200 at carriage tilt bearings, such as journals 246 and bearings 280 (see FIG. 35). The starboard and port side support tilt rests 405 and 404 respectively bear upon the starboard and port carriage portions, such as at starboard and port carriage tilt connections 407 and 406.

This arrangement has one or more advantages or benefits, for example, the center of gravity of the harvester can be kept lower than prior hillside combines. In particular, prior dual wheel combines utilized a central pivot between the front carriage assembly and the body of the combine. This configuration in practice causes a higher center of gravity to be used. With a lower center of gravity the risk of overturning is reduced.

Further advantage is provided by the novel configuration because the extended actuator raises the extended side of the combine body for increased tire clearance. Having the pivot axes near the outer ends of the axle assembly helps to minimize the amount of tire clearance needed and so do the placement of the actuators near the outer ends of the axle. This provides lower center of gravity and better stability.

The inventions described herein also may be beneficial in providing a turning radius to be maintained as short as a non-leveling combine. They may also provide more consistent balance between the front and rear tire and wheel sets. Further advantage may be obtained with regard to the imposition of the combine body weight onto reaction points which are spaced apart and near to the wheel and tire sets. This reduces stress on the front axle and other components of the front carriage assembly.

Other benefits and advantages are described below and still others may only become appreciated at a later time after experience is gained about the novel configurations shown or described herein. Having given a general explanation of some of the inventions provided herein, a more detailed explanation will now be made concerning the various components and their operation for the embodiment shown and alternative implementations thereof.

-Front Carriage Assembly Generally-

Figure 6:
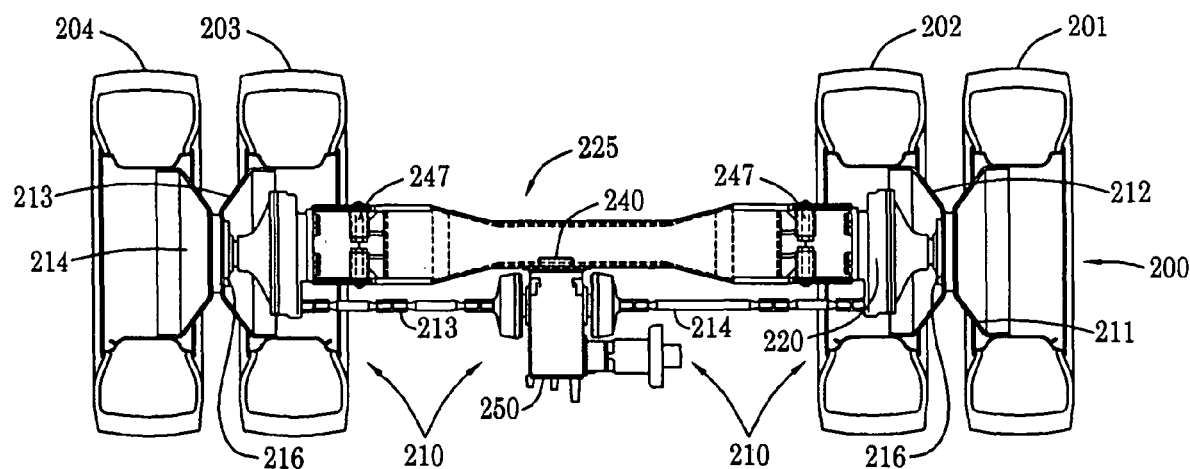
FIG. 6 is a top view showing the front wheels, drive and axle assembly contained in the apparatus of FIG. 1 in isolation.
Figure 7:
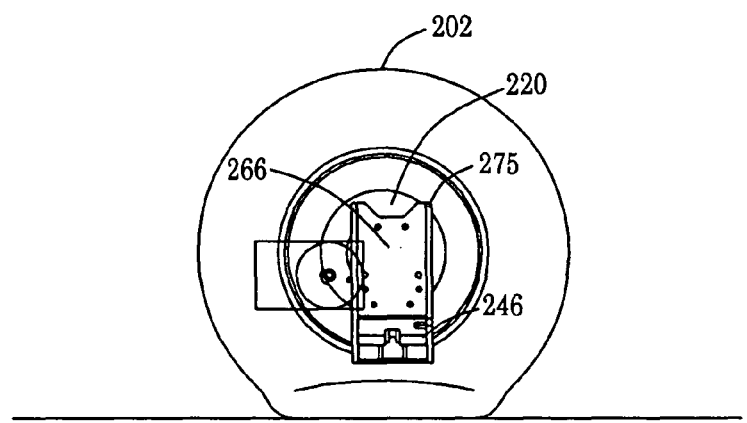
FIG. 7 is a side diagrammatic view of the wheel, wheel drive and portions of the axle of the apparatus shown in FIG. 1.

As shown well in FIGS. 4, 5 and 6, the front carriage assembly 200 carries the supported front weight of the harvester to the wheels 211-214 which are supported on the ground 300 by tires 201-204. FIG. 6 shows the front carriage assembly 200 from above in isolation. The carriage assembly 200 includes a front axle assembly 225, a drive assembly 210, wheels 211-214 and tires 201-204.

Front carriage assembly 200 includes one or more tires or other movable ground contacts which are provided along both sides of implement 100. As shown, wheels 211-214 mount pneumatic tires 201-204 which act as the forward ground contacts which provide locomotion for the implement. The preferred tires and wheels form rolling sets which are the outer or distal ends of the front carriage. The rolling sets may have single or multiple wheels and tires at each side of the harvester or other implement.

Figure 25:
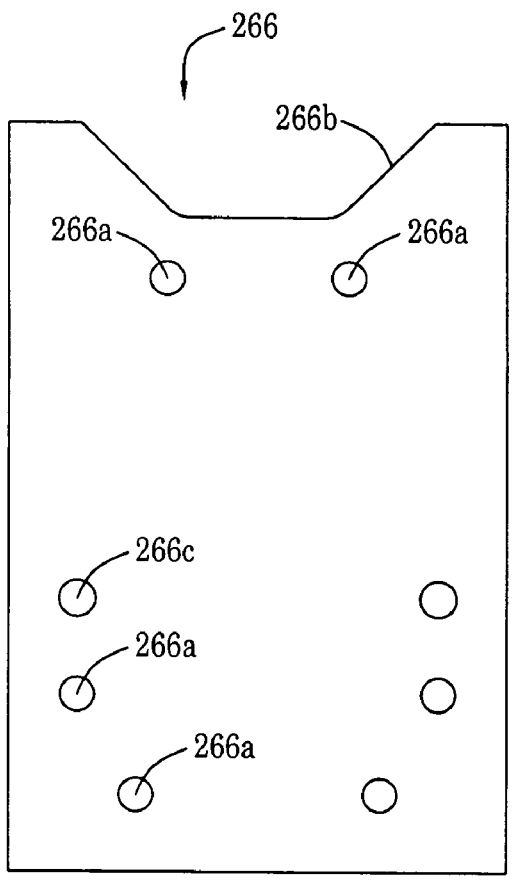
FIG. 25 is an end view of the axle end piece blank used to form the end piece of the axle assembly shown in FIG. 9.

The front carriage assembly also includes a central axle assembly portion 230 shown best in FIG. 11. The opposing ends 266 of axle assembly 230 are doweled and fastened to the final drives 220. Fasteners 217 (FIG. 8) are used by mounting through fastener apertures 266a (FIG. 25) which receive fasteners 271 therethrough. Apertures 266c are used to mount positioning or dowel pins (not shown) for precise positioning of the drive 220 upon end piece 266. The carriage assembly 200 includes final drives 220 to which the wheels are connected at hubs 216 (FIG. 6). The final drives and other features of the wheel drivers are described just below.

-Front Drive Assembly-

The front wheel and tire sets are connected to the distal ends of a drive assembly 210 at the distal ends of axle assembly 225. The drive assembly 210 shown includes final drive mechanisms 220. Final drives 220 may be conventional final drive mechanisms now available or future devices hereafter developed. As shown, they are conventional final drives used on combine harvesters of many types.

The final drive mechanisms 220 have rotational power input thereto from port and starboard drive shafts 213 and 214. Drive shafts 213 and 214 connect to inputs 215 which are connected to turn pinion gears (not shown) which are inside the final drive casings. The pinion gears mesh with and turn large gears (not shown) inside the final drives. The torque provided from the large gears is transferred by shafts or other mechanical connections to turn the final drive outputs which are advantageously in the form of rotating hubs 216 (FIG. 6) of the final drives. Output hubs 216 have the wheel and tires sets securely connected thereto so that drive power is applied to the wheels and tires to move the implement overland.

-Drive Transmission Mount-

Figure 29:
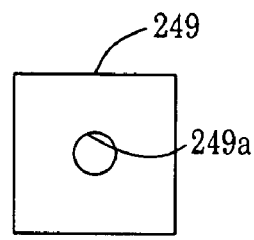
FIG. 29 is a front view of a reinforcement plate used at several places on the transmission mounting plate of FIG. 23.

FIG. 4 and 5 also show a drive transmission mount 240. As shown, transmission mount 240 configured as a plate assembly 242 (also see FIGS. 9 and 11) which is welded or otherwise suitably attached to the central part 230 of axle assembly 225. Reinforcement pieces 249 (FIGS. 9, 11 and 29) are welded to and form part of the transmission mount plate assembly 242. Also advantageously provided is a stiffener or back piece 244 (see FIGS. 9, 11 and 12) which increases the strength and stability of the mount against the large forces and torques to which it is subjected.

FIG. 5 illustrates transmission mount 240 with a central drive transmission 250 fastened to the mount using apertures 241 and corresponding mounting holes 252 on the central drive transmission, both of which receive mounting bolts or other suitable connectors.

-Further Aspects of Front Axle Assembly-

FIGS. 8-12 show further details of the front axle assembly 225 forming part of the front carriage 200. The front axle has a central portion 230 and end portions 235. The front axle assembly is preferably a weldment formed from a number of pieces that form the central portion 230 and end portions 235 and preferably integrate many of them into a single monolithic axle structure. Some parts are detachable as will be apparent from the description given herein.

Figure 20:
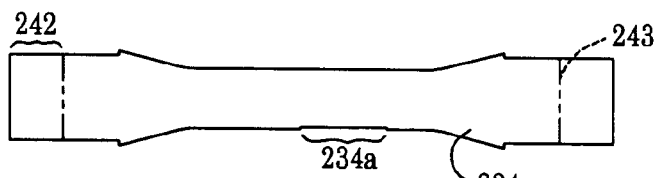
FIG. 20 is a diagrammatic view before bending of a top piece forming part of the axle assembly.
Figure 21:
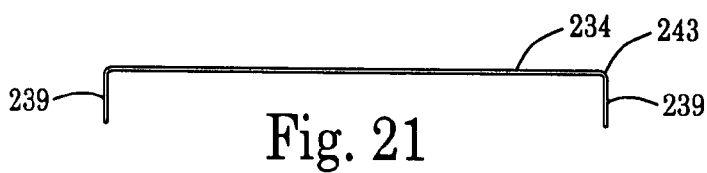
FIG. 21 is a front view of the top piece of FIG. 20 after bending.
Figure 24:
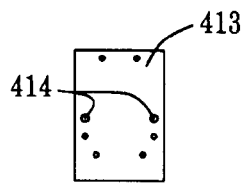
FIG. 24 is an end view of the mounting pieces secured to the implement body to mount the side supports thereon.

More specifically, the central portion 230 of the axle assembly has a top plate 234 (FIGS. 11, 20 and 21) with bends 243 that provide downwardly oriented reinforcement ends 239. The reinforcement ends 239 of top plate 234 effectively provide one divide between the central axle assembly 230 and the end portions 235 and are used to support the support journals upon which the body portion of the implement are set and detachably removed. Although reinforcement ends of top piece 234 form part of the conceptual division between the central and end portions, the sides and bottom are divided at a different point to provide overlap and integration between the portions to allow the preferred integration into a monolithic weldment forming most or all of the axle assembly. As best shown in FIG. 20 the top axle piece 234 has a transmission mount cutout 234a along the rear edge. As FIG. 12 best shows the top axle piece 234 central section overhangs the side pieces 236 (see also FIG. 22).

Figure 18:
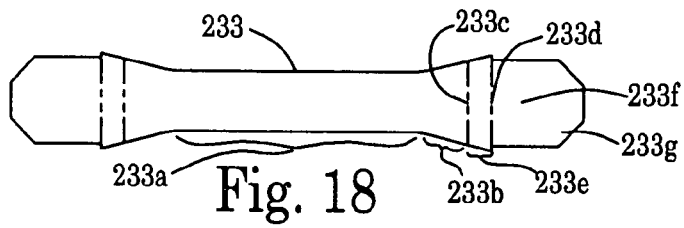
FIG. 18 is a diagrammatic view of a bottom piece used in the axle assembly.
Figure 19:
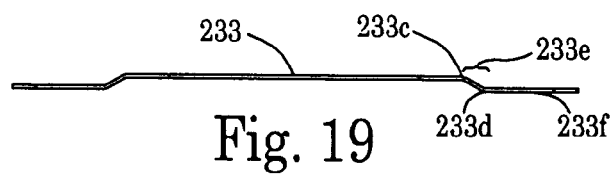
FIG. 19 is a front view of the bottom axle piece shown in FIG. 18.
Figure 23:
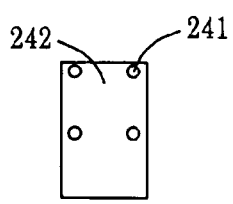
FIG. 23 is a front view of a transmission mounting plate blank used on the front of the axle assembly to mount a power transmission used to supply power to the wheels of the front carriage assembly.

The front axle assembly also preferably includes a bottom plate 233 (FIGS. 11, 18 and 19). The bottom plate is shown in isolated detail in FIGS. 18 and 19. The bottom plate has a central section 233a which has parallel sides. Trapezoidal or flare portions 233b are outward of the central section 233a. Bend lines 233c and 233d are used to define depending obliquely angled portions 233e at toward each end. The bend 233d is opposite and substantial equal to the angle of bend 233c to provide an end section 233f which is parallel to the central section. A tapered and truncated extreme end portion 233g angles inwardly and can be seen in the top view of FIG. 12 as well as in detail views, FIGS. 18 and 19.

Figure 16:
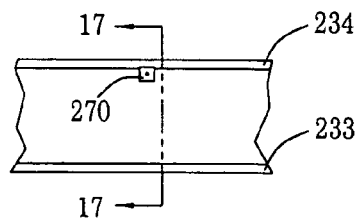
FIG. 16 is a partial back view showing a central portion of the axle assembly in isolation as viewed by view line 16-16 of FIG. 12.
Figure 17:
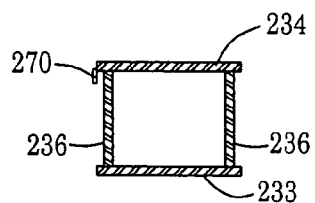
FIG. 17 is a cross-sectional view of the central portion of the axle assembly illustrated in FIG. 16 taken along line 17-17.
Figure 22:
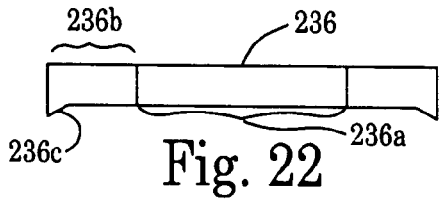
FIG. 22 is an elevated view of the front and back side pieces used in the preferred axle assembly weldment.
Figure 30:
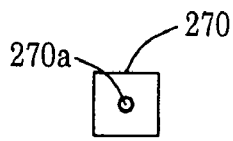
FIG. 30 is a rear view of a mounting piece attached to the rear side of the axle assembly near the middle of the axle assembly for use in coupling a body tilt detector between the axle and body.
Figure 38:
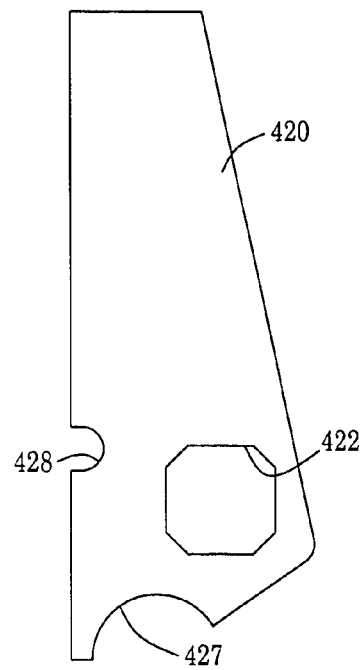
FIG. 38 is a front or back view of a component used in the side support shown in FIG. 31.
Figure 39:
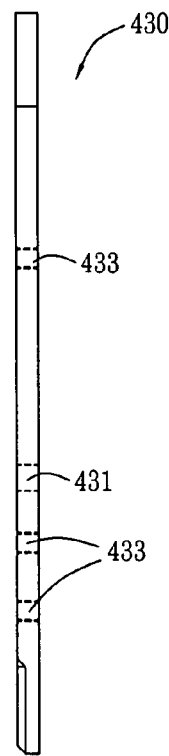
FIG. 39 is an edge view of the component shown in FIG. 40.
Figure 40:
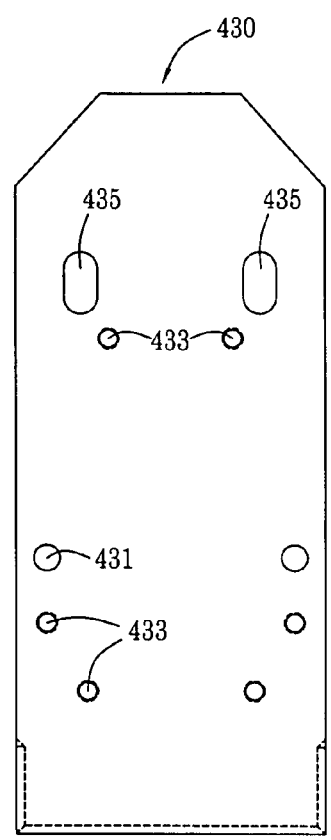
FIG. 40 is a side view of a plate which is a component of the side support shown in FIG. 31.
Figure 41:
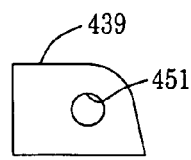
FIG. 41 is a side view of another component part of the side support shown in FIG. 31 used to support a pivot pin passing through the upper end of the hydraulic actuator.
Figure 43:
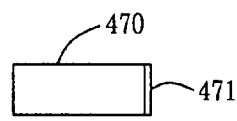
FIG. 43 is a top view of the component part of FIG. 42.
Figure 42:
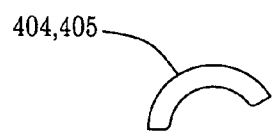
FIG. 42 is a side view of another component part of the side support shown in FIG. 31.
Figure 44:
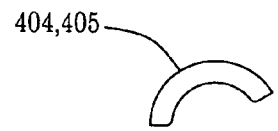
FIG. 44 is an end view of a support pivot rest used as a component of the side support of FIG. 31.

The front axle weldment also includes front and rear side plates 236 (FIGS. 9, 11 and 22). As shown, the side plates 236 have a central section 236a, end segments 236b and a depending lower edge portion 236c. FIG. 17 shows a cross-sectional view of the front axle weldment taken along section line 17-17 of FIG. 16. FIGS. 16 and 17 also show the detector mounting piece 270 detailed in FIG. 30.

-Front Axle Assembly Tilt Connections-

Figure 13:
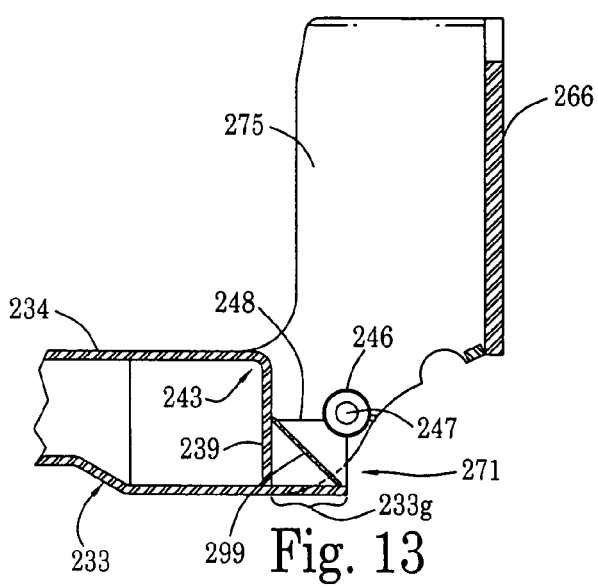
FIG. 13 is an enlarged sectional view of one end of the axle assembly taken along line 13-13 of FIG. 15.
Figure 15:
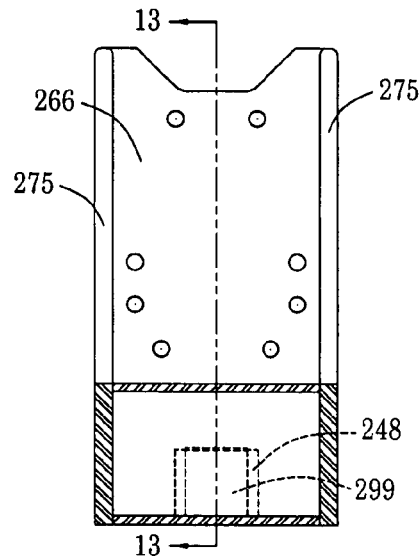
FIG. 15 is a cross-sectional view showing in isolation the end portion illustrated in FIGS. 13 and 14. Some portions which might have been shown in hidden lines have been removed to simplify the figure.

The end portions 235 of the front axle weldment further advantageously include tilt support assemblies 271 (FIG. 13). The tilt support assemblies 271 are preferably configured to provide a cylindrical or semi-cylindrical journal adapted for pivotal action thereon. As shown, this is provided by cylindrical journal pieces 246 having interior bores 247 through which the bottom support pin 601 (FIG. 35 and 52) extends to support the lower end 506 of hydraulic actuator 500 by extending through lower end aperture 507. Although mounting the actuators along the same axis as the rests is preferred, it is not required.

Figure 14:
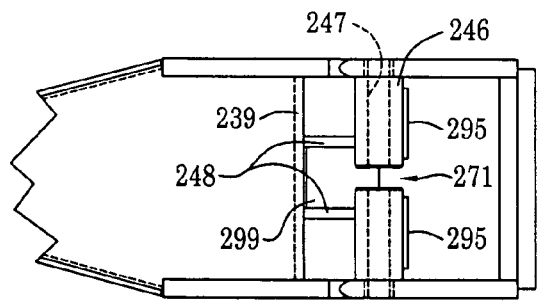
FIG. 14 is a detail top view showing an end portion of the front axle.
Figure 26:
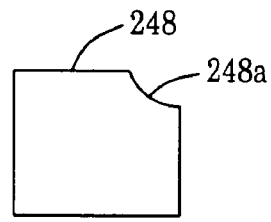
FIG. 26 is a front view of a journal support piece in isolation which is used to support the pivot journal tubes mounted within the ends of the axle assembly.
Figures 27, 28:
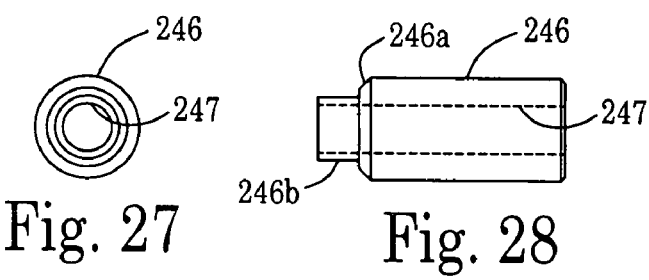
FIG. 27 is an end view of one form of journal pivot tube which may be used within the ends of the axle assembly.
FIG. 28 is a side view of the journal pivot tube of FIG. 27.

The journal pieces 246 are shown in detail in FIGS. 27 and 28 and installed in FIGS. 13 and 14. As shown, the journals have a mounting extension 246b which extends into apertures formed in the front and back walls 275 of the end portions 235. There are also journal support pieces 248 in the form of upstanding plates having quarter circular cutouts 248a (FIG. 26) which support the inward ends of the tubular journals 246.

The tilt support assemblies 271 also may advantageously include an angled plate 299 which is connected between the journal support pieces 248 to provide added structural stability and strength for the journals which must sustain the weight of their side of the heavily laden front carriage. It further stabilizes the extension 233g of the bottom axle piece 233 and ties it to the downward portion 239 of the top axle piece 234.

The outer diameter of the journals 246 are capped by journal bearings 280 shown in detail in FIGS. 53-56. The journal bearings are preferably of a suitable bearing material such as a journal bearing brass, shaped as illustrated. The bearings may be in various suitable configurations. The current preferred configuration is shown in FIGS. 53-56 and will now be described in further detail.

The bearings are constructed to facilitate inserting and retaining them on the journal pieces 246. The preferred bearings are semi-cylindrical in outer shape (or semi-cylindrical tube sections) and cover the upper half of journals 246. The bearings 280 are prevented from rotation by a small bar or key 295 (FIG. 14) attached to journals 246. The detail drawings show that bearings 280 preferably have inside beveled end chamfers 283 and 288 at each end. There are also extensions 284 which are shaped to allow the bearings to snap onto journals 260 using extensions 284. The inside points 286 are more than 180 degrees of arc apart. The tapers facilitate insertion or installation. There are also cutouts 285 along the lower portions of the inside ends. Bearings 280 are shown interposed between journals 246 and the rests 405 and 406, shown in sectional view in FIG. 35.

-Side Supports and Mounts on Implement Body-

FIG. 8 shows that the preferred inventions described herein preferably include having side supports 411 and 412 (see also FIGS. 31 and 35). The side supports are rigidly secured, such as by fasteners, pins or both, to the implement body 110 using support mounts 413 which are welded to the body or otherwise suitably attached thereto, for example, with fasteners and pins not shown.

FIGS. 31-34 and 38-47 and 49-50 show various components used in the current preferred construction of the side supports. The side supports are detachably connected to the axle assembly by the hydraulic cylinders 500 to allow upward and downward movement of the body relative to the axle assembly. The hydraulic cylinders 500 and their interaction with both the side supports and axle end portions allows body leveling via tilt action between the body and axle.

Preferably included in such constructions for the body side supports are front and back plates 420 (FIG. 26) which advantageously form upright components in a weldment or other form of assembly which has the indicated parts and features, as further described herein.

The preferred weldment also includes a support contact mounting plate 430. Mounting contact plate 430 preferably has dowel receptacles 431 for receiving dowel pins (not shown) therein used to help establish and maintain the contact plate in accurate position upon the fixed mounts 413 on harvester body 110. Additionally, the contact plate 430 has fastening apertures 433 therein that may be tapped to receive connection fasteners 414 (FIG. 8) which extend through a suitable member of the harvester body and into the tapped holes 433.

Connection of the side supports on the side mounts secured to the implement body may be facilitated by holes 435 (FIG. 34) which may be sized so as to be loosely received over mounting studs (not shown) affixed to the implement body mounting plates 413. This allows the relatively heavy weldments forming the side supports to be initially installed onto the implement with more precise positioning and greater securement provided by dowel pins in receptacles 431 and fasteners in apertures 433.

Figure 48:
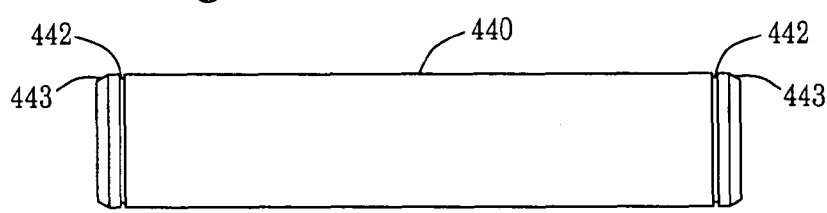
FIG. 48 is a side view of a pivot pin used to support the upper ends of the hydraulic actuators to the upper portions of the side supports of FIG. 31.
Figure 49:
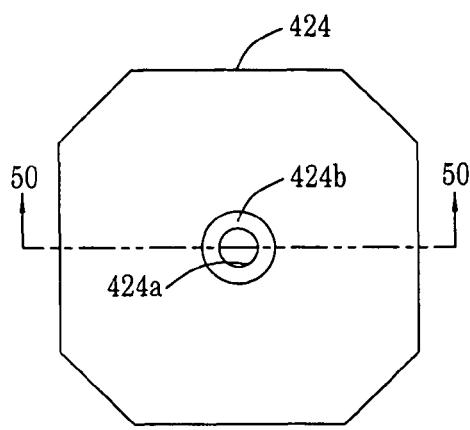
FIG. 49 is a slide pad used in the side mounts of FIG. 31 to facilitate sliding action between the side mounts and the receivers formed within the end portions of the axle assembly.

The preferred weldment also includes a top plate piece 471 (FIG. 31) that is joined to the contact plates 430 and pivot pieces 439 having chamfered corners 438 (FIG. 31). The top piece 471 is connected to pivot pin guides 439 (FIG. 31) which may be welded thereto or otherwise connected in a suitable fashion. Guides 439 support a mounting pin 440 (FIG. 48). The top mounting pin 440 extends through the top connection apertures 501 of leveling actuator 500 (see FIGS. 36 and 37). Mounting pin 440 extends through the front and back plates 420, guides 439 and through top connection aperture 502 of the level operator 500.

The preferred body side support assemblies 411 and 412 are also advantageously provided with laterally distal corner irons 480 (FIGS. 31-34 and 35). The corner irons or pieces are connected to provide stabilization between the front and back plates 420 near the bearing rests 404 and 405.

Figure 45:
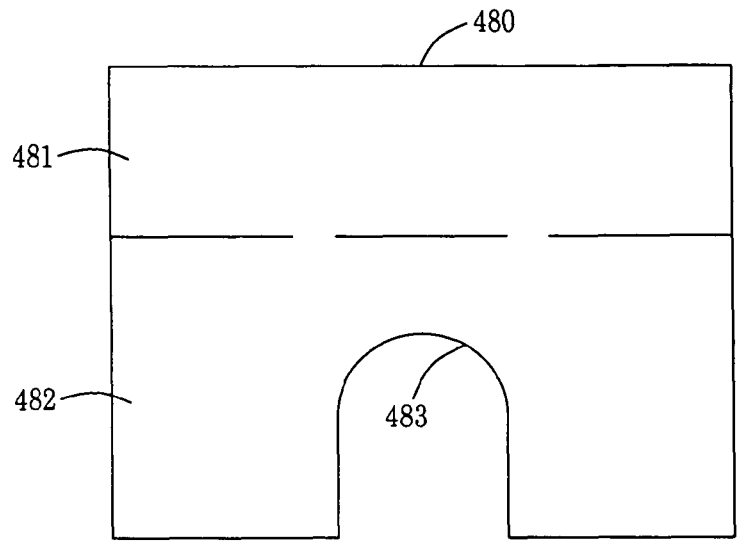
FIG. 45 is a bottom view of another component piece used adjacent the outer corner of the side support.
Figure 47:
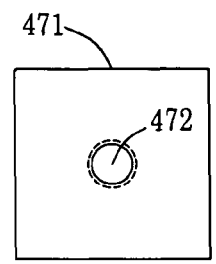
FIG. 47 is a plan or top view of a pick-up plate used at the top of the side support of FIG. 31 which allows the side support to be lifted and reinforces the assembly at the top thereof.

Pieces 480 are detailed in FIG. 45 which shows an upper section 481 and a lower section 482 which are connected along a bend. A clearance cutout 483 is provided in the lower section 482 to assure clearance relative to the bottom 507 of the hydraulic actuators 500.

Rests 404 and 405 are also supported by bearing rest stabilizers 465 (FIG. 33). Stabilizers 465 extend between the bottom of the contact plate 430 and the bearings and form a flange along the bottom of the contact plate 430. Bearings 404 and 405 bear upon journals 406 and 407, respectively.

-Leveler Actuators-

FIGS. 36 and 37 show a preferred type of leveler actuator or operator 500. Actuator 500 has an upper mounting end 502 with the mounting aperture 503 therethrough. The lower mounting end 506 is connected to a movable piston (not shown) on the inside of hydraulic cylinder 508. Pressure may be applied to the upper end of the cylinder 508 to extend the length of the operator by extending the lower mounting end 506. Retraction of the mounting end 506 is accomplished by providing pressurized hydraulic fluid through tube 509 to near the bottom of hydraulic cylinder 508.

When installed the leveling actuators in the form of hydraulic cylinders 500 are connected between the body side supports at pin 440 and axle assembly 230 at axle end portions 235. As shown, this is done using journals 246 and bearings 380.

The front carriage axle end portions 435 form, as illustrated, receivers 390 (FIGS. 10 and 11) into which portions of the side supports are received. The upper end of the actuator 502 has an aperture 503 which receives upper pivot pin 440 (FIG. 48) at a pin receiving bore 451 formed in pieces 439. Pin 440 is received through the upper end mounting aperture 503 of the actuator. Pin 440 is held in place against lateral movement by snap rings 445 (FIG. 35) which extend into groove 442 (FIG. 48) of pin 440 (see FIG. 35). Pin 440 may have chamfered ends 443.

FIG. 35 shows that the lower end 506 of the leveler actuators 500 is also preferably connected by pin connections at a suitable position to the axle assembly. As shown, this is most conveniently done at or along the pivotal axes of the journals 246 and rests 404, 405 which provide a detachable tilting connection between rests 404, 405 and journals 246 which provides pivotal angular movement there-between. Space between the journals allows the lower end 506 of the leveler actuator to be positioned therein and pinned such as by using pin 601 into a pivotal connection with the axle assembly using line bores 247 through journals 246. Alternative configurations where the lower end connection of the actuator is not aligned with the journals 246 used in the detachable tilt connection may alternatively be operable within a range of configurations.

Both levelers 500 may be contracted to bear the harvester body 110 upon journals 246 held by the central axle at positions near the axle end plates 266 which connect to the final drives 220 with bolt or other fasteners that extend through the apertures 266*a*.

-Interaction Between Side Supports and Front Axle Ends-

The side supports 411, 412 are received within the partial box-shaped receivers 290 (FIGS. 9-11) formed within the axle end portions 235. FIG. 35 shows the body side support positioned in the receiver with the various parts of the axle ends 235 surrounding the body side supports about the end and adjacent front and back walls 275 of the axle end receiver.

To facilitate interaction between the body side supports and the associated axle end receivers, the side supports have preferably been provided with certain features which will now be described in greater detail.

FIG. 35 shows a side support 411, 412 fully at rest installed in the axle end receiver. The rests 404, 405 are resting upon the annular pivot bearing 280 illustrated in detail and in isolation by FIGS. 53-36 and described more fully elsewhere in this document.

FIG. 35 shows pseudo-octagonal shaped apertures 422 formed through walls 420. FIGS. 33 and 35 show a correspondingly shaped back-up piece 423 positioned in aperture 422. As shown, the backup piece 423 is thinner than the walls 420 and set at a position which creates a recess within the walls of aperture 422. The recess is used to mount an anti-friction and/or wear pad 424. Pad 424 helps to minimize contact area as the body side mounts are moved into their corresponding receivers 290. The wear pads are made of a variety of suitable materials, such as a bearing brass.

The wear pads 424 are started into the receivers using the curved top edge of receiver walls 275. The wear pads are of proper thickness to help stabilize the side support within the receiver while allowing movement without binding.

Figure 46:
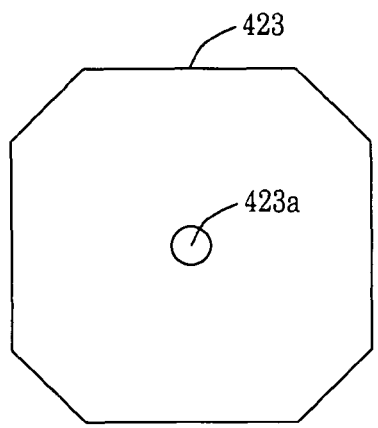
FIG. 46 is a component forming a backup piece used in the front and back plates shown in isolation in FIG. 38 which are used in the side support of FIG. 31.
Figure 50:
FIG. 50 is an edge view of the slide pad of FIG. 49 taken along line 50-50 of FIG. 49.

FIG. 35 also shows wear pads 424 are held in position by wear pad fasteners 425. Fasteners 425 preferably have a conical head for reception into a countersunk aperture 424a (see FIGS. 49 and 50) having conical converging countersinks 424b. FIG. 46 shows the back-up piece 423 having aperture 423a through which the fastener 425 extends. Fasteners 425 as shown are countersunk head bolts with associated nuts and washers (see FIG. 35).

The wear pads serve not only as a form of linear bearing, but also serve as wear parts that can easily be replaced when worn out and maintenance is required.

-Actuator for Header, Feeder or Other Front Attachment-

Figure 57:
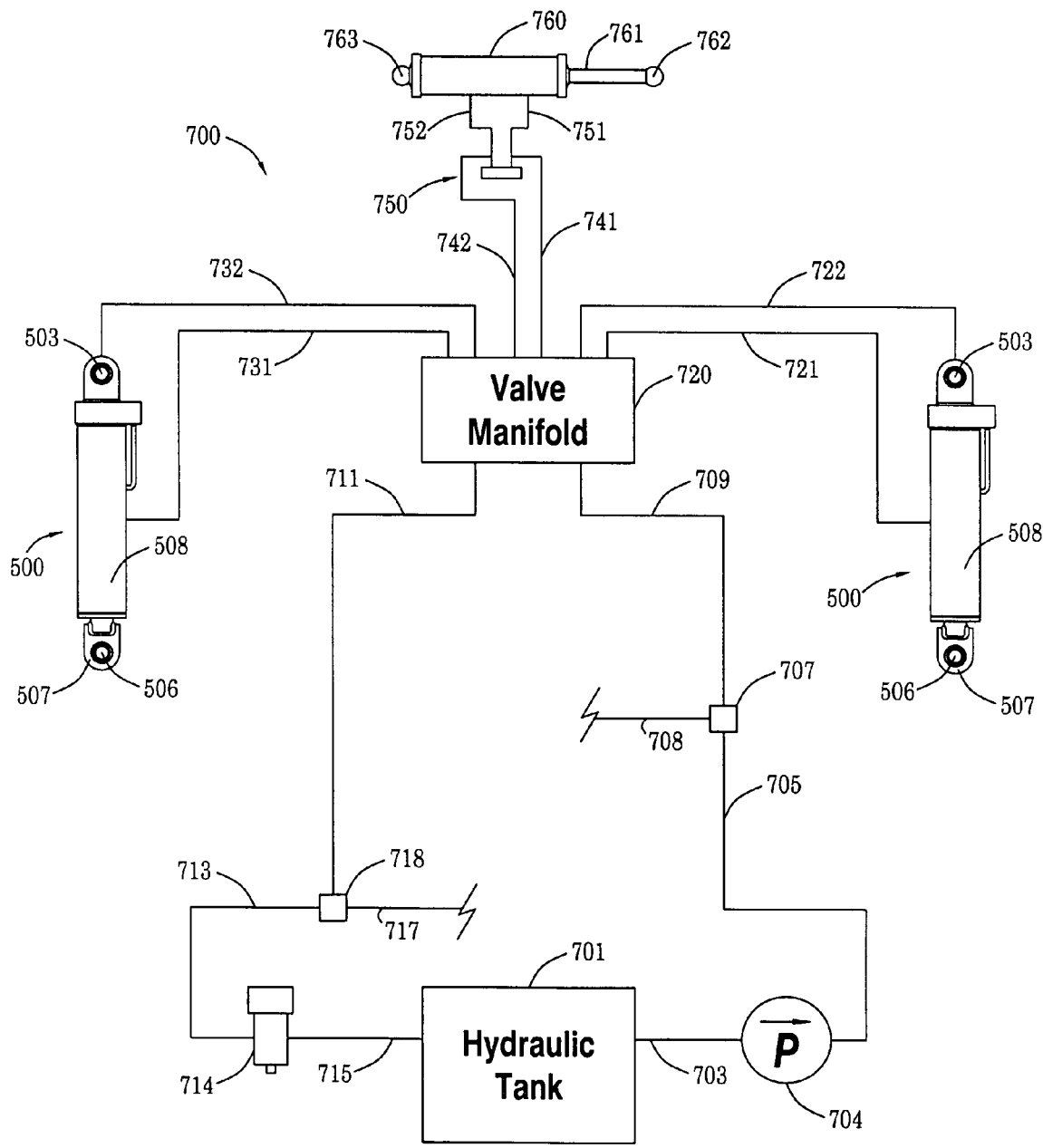
FIG. 57 is a hydraulic schematic diagram which may be used in the systems according to the invention.

FIG. 57 shows front tool tilt actuator 760, for example a tilt actuator for a combine header and associated feeder (not shown). Although one tool actuator is shown, there may in some cases be a desire to use plural tool actuators. For example the pivotal action described could alternatively be accomplished using two, or even more, actuators depending on the specifics of the tool involved and the desired action thereof.

The construction preferred and illustrated allows the conventional header and associated feed mechanism to maintain a tilt angle which provides for proper orientation of the header or other tool relative to the ground or other orientation for which the tool needs to be oriented. The control of the tool tilt actuator 760 is provided by the hydraulic system described below in a suitable construction so that the tool is mounted to the main body 110 at one end, such as connection 763, and the tool at the opposing end connection, such as connection 762. Such header and feeder actuators for combines may be of conventional construction. The tool is in this construction mounted for pivoting about a single pivot which is advantageously at the front center of the combine. Actuator 760 is connected between the main body and the tilting header or other tool in a manner which causes the header to pivot about a tool pivot axis (not illustrated). In the case of a combine header and feed mechanisms, they pivot about a center head and feed mechanism pivot axis which extends perpendicular to the front axle at the front center of the combine body.

Extension of actuator 760 causes the piston rod 761 of the actuator to extend the overall length between actuator connections 762 and 763. Contraction of actuator 760 causes the piston rod 761 to contract the overall length between actuator connections 762 and 763. Such extension and contraction causes the header or other tool to pivot relative to the main body, such as in a conventional fashion or as hereafter developed.

-Hydraulic Control System-

FIG. 57 shows in diagrammatic form a preferred hydraulic system or hydraulic control system 700. Hydraulic system 700 may be used in connection with the leveling of the main body 110 and adjustable tilting of a cutting header or other tool (not shown). Additionally, the hydraulic supply portions may also supply other hydraulic devices on the implement 100.

The hydraulic system 700 includes a hydraulic fluid tank 701. Hydraulic fluid is conveyed by a hydraulic fluid pump supply line 703 and is pumped using a suitable hydraulic pump 704. The outflow from pump 704 passes through a pressurized pump outflow line 705. Line 705 is connected to a flow splitter 707 with part going to conventional hydraulic features of the combine or other implement using branch line 708. Return fluid supplied through branch line 708 returns to the hydraulic tank 701 using a conduit 717 to a flow converger or converging fitting 718. The converger 718 converges the flow of return lines 717 and 711 and passes such flow through flow return line 713. The flow through line or conduit 713 advantageously passes through a hydraulic fluid filter 714 to clean the fluid which passes through filtered return line 715 to tank 701.

Pressurized hydraulic fluid also flows via line or conduit 709 to a valve manifold 720 or other suitable manifold. Either with manifold 720 or by other control valving, the pressurized fluid is valved and flows to the hydraulically operated components. As shown, the hydraulically actuated components which are directly relevant to the inventions described herein are the right and left leveling actuators 500, and the header and feeder actuator 760 used to tilt the header and feeder or other tool into the desired orientation.

As explained above, the body leveling actuators 500 have the upper and lower pivot pin apertures 503 and 507, respectively. The lower ends of the hydraulic actuators are connected to internal pistons (not shown) within the hydraulic cylinders 508. The lower ends of the actuators extend and retract in order to extend or contract the overall length of the actuators. In the configuration shown, the top ends of the actuators are connected to the body supports and the bottom ends are connected to the axle end portions as detailed elsewhere herein.

The hydraulic system 700 is also used to controllably extend and contract a front tool tilt actuator 760, for example, such as to tilt a combine header and associated feeder. This allows the header to maintain a tilt angle which provides for proper orientation of the header or other tool relative to the ground or other orientation for which the tool needs to be oriented. The control of the tool tilt actuator is provided by this system in such a way that the tool is mounted upon the front of the main body 110 at a single pivot which is at the center of the implement. The actuator 760 is suitably connected to operate the tool in a manner which causes operation of the tool. Additional actuators may be desired and suitably configured and controlled.

The above action is effected by supplying pressurized hydraulic fluid through contraction fluid line 751. Correspondingly, the overall length of actuator 760 is extended by supplying pressurized fluid through extension supply line 752. The supply to actuator 760 is controlled by the tool tilt hydraulic control valve 750. Control valve 750 is preferably selected to be of a type of hydraulic valve which is electrically controlled in a conventional fashion. Electrical control may thus be provided by the electrical control system 800 using the header angle control interface 858.

-Electrical Control System-

Figure 58:
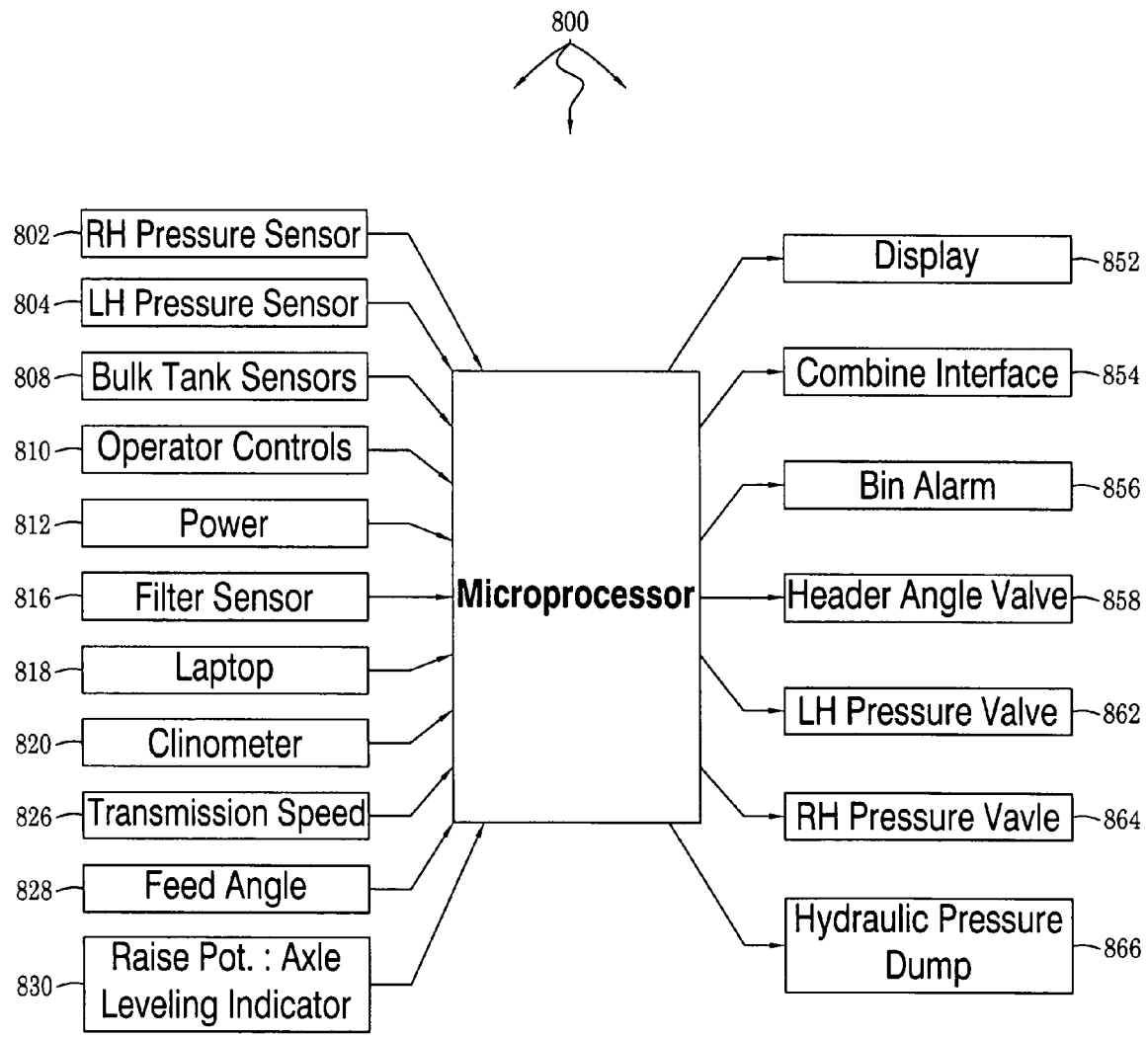
FIG. 58 is an electrical schematic diagram which may be used in the systems according to the invention.

FIG. 58 shows a preferred electrical control system 800 according to a preferred embodiment of the invention.

Control system 800 may be in part be provided in an original vehicle and in part by a retrofit system, or all by a retrofit system.

Control system 800 includes a microprocessor which may be of various types which receive input signals, provide output signals and provide analytical processing to facilitate or automate control of the combine or selected parts of the combine or a retrofit system used upon a combine or other hillside implement.

Electrical control system 800 includes a number of sensors which are either retrofitted or part of the original design of the hillside implement. Sensors 802 and 804 sense the right and left hydraulic pressure supplied to the respective actuators and can be used to determine load at that actuator when the actuator has been extended to a sufficient degree so as to lift the detachable rests from the journal or other carriage support feature.

Detector 808 is used to represent any tank which may be in need of monitoring because it is sufficiently large to effect weight distribution of the implement; for example fuel tank contents or grain bin contents. As shown, detector 808 detects the level of grain in the grain bin of a combine harvester and this information is used in the control of leveling of the main body. It may also be used to limit the amount of grain placed into the grain bin when the slope exceeds the maximum adjustment capability.

Block 810 generally indicates operator controls which can be used to manually operate various features of the implement. Some such controls affect other more automated aspects of the control system in addition to manual control effected using the microprocessor as a controller.

Power to the microprocessor and other parts of the control system is supplied by a suitable power supply 812.

Detector 816 is used to detect whether the hydraulic oil filter is excessively impeding flow of hydraulic fluid therethrough and needs to be replaced.

Detector 820 is a clinometer which measures the level of the main body relative to gravity.

Detector 826 measures the transmission speed which is a reliable indicator of implement ground speed in most operational situations.

Detector 828 measures the relative angle between the header and feed subsystems relative to where they are mounted. In the preferred embodiments, the header and feed subsystems are mounted to pivot about a central single pivot upon the main body of the implement.

Detector 830 may be in the form of a potentiometer that is connected between the central part, preferably dead center, of the axel assembly and the main body to indicate the axel tilt angle in real time.

FIG. 58 also illustrates an operator control display 852 which may be provided to display various information to the human operator.

A hydraulic pressure dump valve 866 is shown diagrammatically. The dump valve is controlled to close so that hydraulic pressure can be developed in the system.

Bin alarm 856 is connected to the microprocessor to alert the human operator to a full condition of the grain bin given the current operational conditions.

The microprocessor also is used to control the header and feed subsystems to a desired tilt angle given other inputs to the control system.

The left hand pressure valve 862 is used to controllably provide hydraulic fluid to the left or port side leveling actuator.

The right hand pressure valve 864 is used to controllably provide hydraulic fluid to the right or starboard side leveling actuator.

Item 854 is to generally indicate a wiring harness or other control interface used to connect the specific control system with the more comprehensive control system of the combine or other implement. This is particularly significant when the system according to the invention is used to retrofit a pre-existing implement, such as a combine harvester not previously having sidehill leveling capability, or inadequate sidehill leveling capability.

-Methods & Operation-

The invention has already been described herein with regard to many aspects of the methods performed and operation of the leveling implement 100 and tool tilt operations. Additional explanation will now be provided to supplement other explanation given herein.

Methods according to the inventions may include adjustably leveling the implement body with respect to a transverse front axle assembly. This leveling serves by maintaining the body in a level condition or moving toward level condition. The orientation of the front axle assembly is approximately the same as the slope of the ground over which the front carriage assembly is moving. Such leveling being accomplished by levelers which may be controlled to perform extending and contracting modes of actuation. When a leveler extends the action performed is a tilting action of the implement body with respect to a first pivot or other tilting connection which is on the opposing side of the implement from the extending actuator.

Tilting in the opposing direction involves contracting a previously extended actuator and then extending the other actuator to achieve tilting action about a second pivot or other tilt connection which is on the side opposite to the first tilting connection.

The titling actions are preferably controlled using a clinometer 820 or other level or incline sensor which is preferably mounted upon the body of the implement. This can be used to provide control of the actuators to achieve a desired degree of extending to achieve the tilt or roll angle needed to level the implement body. This sensing step may be used in a determining of the orientation of the axle assembly.

Preferred methods also include measuring or detecting the current angular or tilt relationship between the axle and implement body, such as by using the axle angle indicator, preferably in the form of a potentiometer connected between the axle and body.

Methods according to the inventions may also include sensing a load carried by an extended leveler using transducers 802 and 804 to measure hydraulic pressure to the actuators 500. Such information can be used perform a warning or indicating of the load carried by such leveler. This may also be using in a controlling function to limit the load for a given tilt angle determined in the tilt angle measuring or sensing step.

The inventions described herein further include relieving the load from a tilt actuator and onto a tilt rest connection when that side of the implement is uphill as compared to the opposing side of the implement. This relieving is done by contracting the tilt actuator on the uphill side to bring the downhill side rest onto the associated journal and associated bearing 280.

-Manner of Making-

The various components described herein are preferably made of a suitable steel for strength, toughness and ability to be formed by welding into weldments. Other common metal working techniques can be used to provide other features having the structure and functional capabilities described herein.

The bearing materials are preferably selected from a variety of suitable bearing metals, such as brass bearing metals of numerous types.

-Further Aspects and Features-

The above description has set out various features and aspects of the invention and the preferred embodiments thereof. Such aspects and features may in various combinations be used to define the inventions described in this document.

In one aspect the inventions include a main body leveling operator or operators to angularly adjust the implement body relative to the axle assembly tilt angle which stays oriented on the ground. This may be used approximately to level an implement body for improved utility in hillside use.

In another aspect the inventions include having spaced opposing bearings on the implement body which bear upon journals or other components forming a tilting connection between the axle assembly and side supports on the implement body. Such tilting connection may be a pivoting connection in preferred forms of the invention. Other tilting joints or connections now known or hereafter developed may alternatively be suitable for use in inventions according hereto.

In another aspect the inventions include using such tilting joints or connections in two outward positions which are nearer the wheels and tires to reduce the bending moment applied to the axle.

In a further aspect the inventions include electrically sensing the slope or incline of the carriage assembly 200 and controlling the extension and contraction of the leveler operators to provide controlled adjustable leveling of the implement body when traversing ground that has a slope, particularly a side hill slope.

-Interpretation Note-

The invention has been described in language directed to the current embodiments shown and described with regard to various structural and methodological features. The scope of protection as defined by the claims is not intended to be necessarily limited to the specific features shown and described. Other forms and equivalents for implementing the inventions can be made without departing from the scope of concepts properly protected hereby.

The invention claimed is:

1. An apparatus forming a hillside combine harvester with a body capable of lateral leveling in response to variations in ground slope, comprising:
   a front carriage assembly having opposing ground contacts adjacent opposing sides of the front carriage to allow overland movement thereon;
   a combine body at least partly supported upon the front carriage to allow lateral tilt adjustment thereon;
   at least one port leveling actuator connected between a port side of the front carriage and a port side of the combine body for controlled operation to extend and contract to effect tilting of the body about an opposing starboard tilt support connection which is detachable;
   at least one starboard leveling actuator connected between a starboard side of the front carriage and a starboard side of the combine body for controlled operation to extend and contract to effect tilting of the body about an opposing port tilt support connection which is detachable,
   wherein the opposing port and starboard tilt support connections are pivotal connections which are configured to be detachable during tilting;
   a header tilt adjustment connection for supporting the header and for allowing header tilt relative to the ground; and
   a header adjustment actuator for adjustably tilting the header relative to the ground.

2. The apparatus of claim 1 wherein the at least one leveling actuator is a hydraulic operator.

3. An apparatus forming a hillside combine harvester with a body capable of lateral leveling in response to variations in ground slope, comprising:
   a front carriage assembly having opposing ground contacts adjacent opposing sides of the front carriage to allow overland movement thereon;
   a combine body at least partly supported upon the front carriage to allow lateral tilt adjustment thereon;
   at least one port leveling actuator connected between a port side of the front carriage and a port side of the combine body for controlled operation to extend and contract to effect tilting of the body about an opposing starboard tilt support connection which is detachable; and
   at least one starboard leveling actuator connected between a starboard side of the front carriage and a starboard side of the combine body for controlled operation to extend and contract to effect tilting of the body about an opposing port tilt support connection which is detachable,
   wherein the opposing port and starboard tilt support connections are pivotal connections which are configured to be detachable during tilting.

4. The apparatus of claim 3 wherein the at least one leveling actuator is a hydraulic operator.

5. An apparatus forming a hillside combine harvester with a body capable of lateral leveling in response to variations in ground slope, comprising:
   a front carriage assembly having opposing ground contacts adjacent opposing sides of the front carriage to allow overland movement thereon;
   port and starboard carriage supports;
   a combine body having port and starboard combine supports at spaced positions which are detachably resting upon the port and starboard carriage supports to provide leveling using two spaced support locations toward the opposing ground contacts; and
   at least one actuator for controllably determining which of the port and starboard combine supports is in contact with their respective port and starboard carriage supports,
   wherein the port and starboard carriage supports are pivotal connections which are configured to be detachable during leveling.

6. The apparatus of claim 5 wherein the at least one leveling actuator is a hydraulic operator.

7. The apparatus of claim 5 wherein the opposing port and starboard supports of the combine body are received within receivers on the carriage.

8. A method of leveling an overland vehicle in response to variations in ground slope comprising:
- extending a port side leveling actuator adjacent to a port side of the vehicle;
- tilting a body of the vehicle in response to the extending of the port side leveling actuator, wherein the body pivots about a starboard side tilt support connection adjacent to a starboard side of the vehicle,
- wherein the starboard side tilt support connection is a pivotal connection configured to detach during pivoting about a port side tilt support connection;
- extending a starboard side leveling actuator adjacent to the starboard side of the vehicle; and
- tilting the body of the vehicle in response to the extending of the starboard side leveling actuator, wherein the body pivots about the port side tilt support connection, the port side tilt support connection being adjacent to the port side of the vehicle, and
- wherein the port side tilt support connection is a pivotal connection configured to detach during pivoting about the starboard side tilt support connection.

9. The method of claim 8 wherein the overland vehicle comprises a hillside combine harvester.

10. The method of claim 8 wherein the starboard side tilt support connection and the port side tilt support connection are detachably coupled opposing ends of a front carriage assembly, the front carriage assembly having opposing ground contacts adjacent opposing sides of the front carriage assembly to allow overland movement thereon.

11. An overland vehicle capable of lateral leveling in response to variations in ground slope, comprising:
- a front carriage assembly having opposing ground contacts adjacent opposing sides of the front carriage to allow overland movement thereon;
- a body at least partly supported upon the front carriage to allow lateral tilt adjustment thereon;
- at least one port leveling actuator connected between a port side of the front carriage and a port side of the body for controlled operation to extend and contract to effect tilting of the body about an opposing starboard tilt support connection which is detachable; and
- at least one starboard leveling actuator connected between a starboard side of the front carriage and a starboard side of the body for controlled operation to extend and contract to effect tilting of the body about an opposing port tilt support connection which is detachable,
- wherein the port tilt support connection is a pivotal connection which is configured to detach during tilting about the starboard tilt support connection and wherein the starboard tilt support connection is a pivotal connection which is configured to detach during tilting about the port tilt support connection.

* * * * *